United States Patent [19]

Holloway

[11] 4,406,471
[45] Sep. 27, 1983

[54] MOBILE FLUID STORAGE TANK
[76] Inventor: William G. Holloway, Box 1092 2130 S. I-35W, Burleson, Tex. 76028
[21] Appl. No.: 298,490
[22] Filed: Sep. 1, 1981
[51] Int. Cl.³ .............................................. B60P 3/22
[52] U.S. Cl. .................................................. 280/5 C
[58] Field of Search ...................... 280/5 C, 5 E, 5 R; 296/15; 220/5 A, 1.5, 5 R; 105/358, 360

[56] References Cited
U.S. PATENT DOCUMENTS
3,212,824 10/1965 Emery et al. ...................... 280/5 C
4,318,549 3/1982 Pletcher ............................. 280/5 C FOREIGN PATENT DOCUMENTS
1024883 2/1958 Fed. Rep. of Germany ...... 280/5 E Primary Examiner—John A. Pekar
Assistant Examiner—D. Lynn Fugate
Attorney, Agent, or Firm—Jacob H. Steinberg

[57] ABSTRACT

A mobile fluid storage tank structure for complete emptying regardless of the pitch of the underlying ground by modifying the floor of the tank to provide two converging pitched portions for the full length of the tank which meet at a point that is at a ratio of 3 to 1 along its horizontal axis between the end walls of said tank.

6 Claims, 6 Drawing Figures

MOBILE FLUID STORAGE TANK

This invention relates to a mobile fluid storage tank that is conventionally known as a frac-tank. This is a large heavy gauge steel tank that is pulled by a tractor to a job site where an oil well is being dug. When it is set down at the site, a vacuum pump truck is used to fill the tank with a drilling fluid containing salt water, acid and pebbled mud which is then pumped into the well to fracturize the earth during the drilling operation. The greatest problem is to completely empty all of the solution because such a solution is expensive and should not be wasted. When conventional tanks are used, it has been the practice to build up the ground under the tank, so that the tank can be sloped downward to cause the fluid to flow toward the front of the tank. Such build-up of the ground is time consuming and expensive.

It is therefore an object of this invention to avoid the need to build up the ground by reshaping the floor of the tank.

A further object of this invention is to so modify the floor of a frac-tank as to obtain complete emptying of the fluid regardless of the slope of the ground on which it rests.

Another object of this invention is to prevent all of the fluid from resting up against the front wall of the tank by providing converging pitched portion on the floor for the full length of the tank so as to provide a central low point where the fluid is made available to a contiguously located exit pipe through which it is sucked out by means of a vacuum pump.

A specific example of this invention will now be described in greater detail to show the construction of the frac-tank with its modified floor plan with reference to the drawings herewith submitted.

Figure 1:
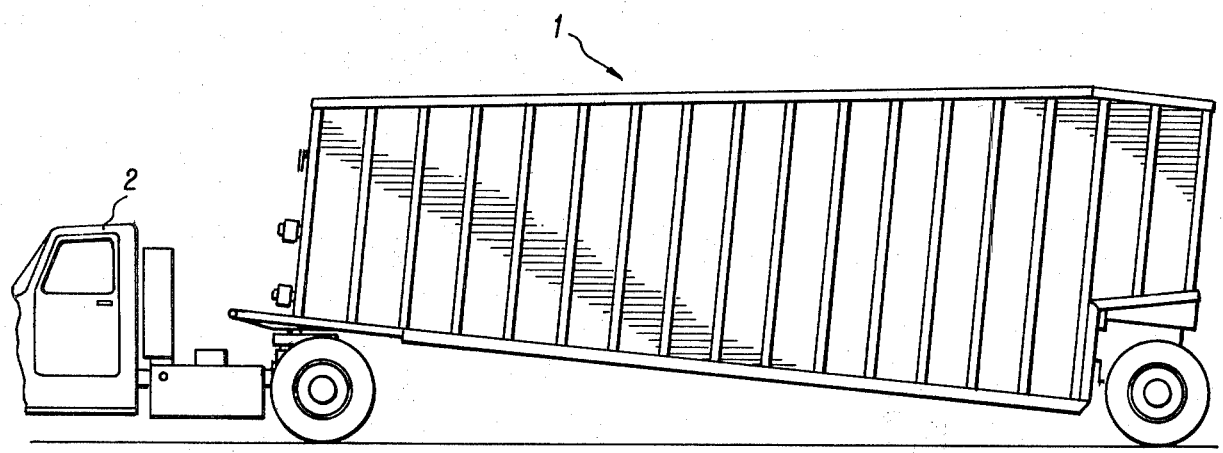
FIG. 1 shows a perspective view of a frac-tank being brought to a working site of an oil well by means of a tractor.
Figure 2:
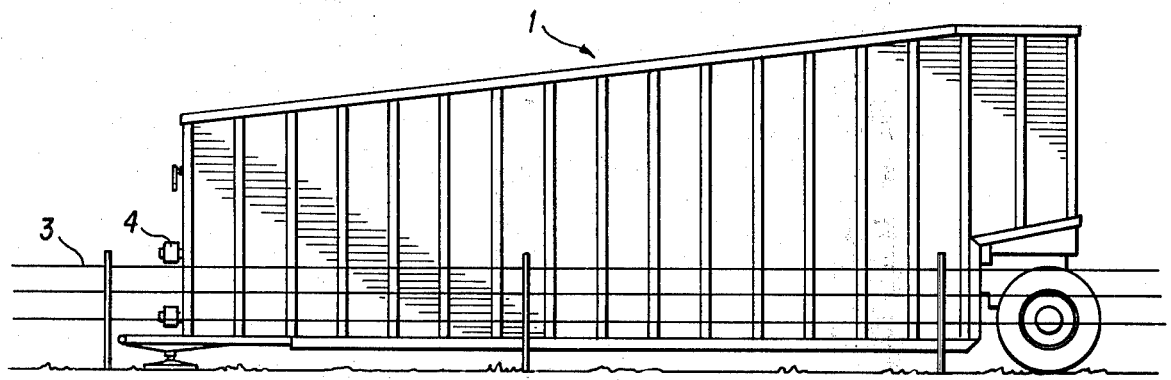
FIG. 2 shows a perspective view of a frac-tank with its manifold being connected to a pump at an oil site to pump the fluid into the well hole being dug.
Figure 3:
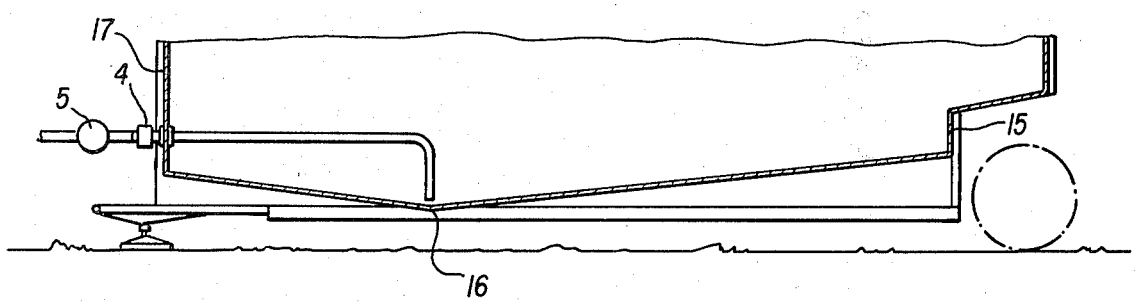
FIG. 3 is a cross-sectional view of the front of the tank to show the construction of the modified reverse flow floor plan.
Figure 4:
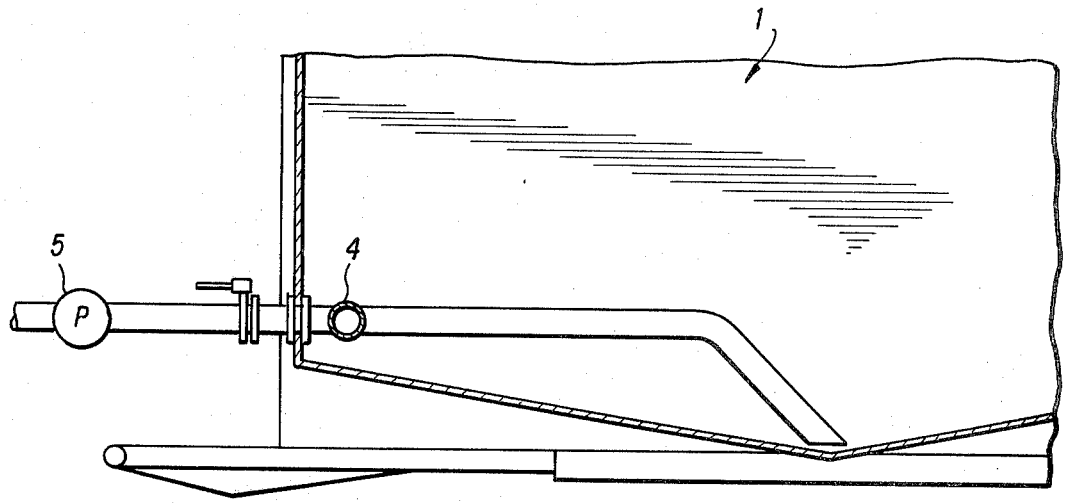
FIG. 4 is a cross-sectional view showing a exit pipe constructed so as to be inside the wall of the tank.
Figure 5:
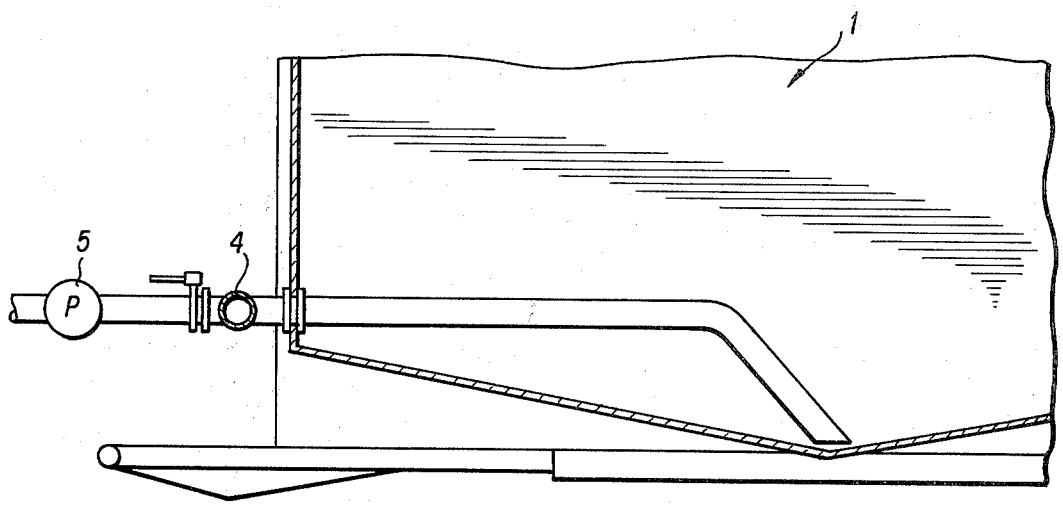
FIG. 5 is a similar view as in FIG. 4 showing a exit pipe construction that is outside the wall of the tank.
Figure 6:
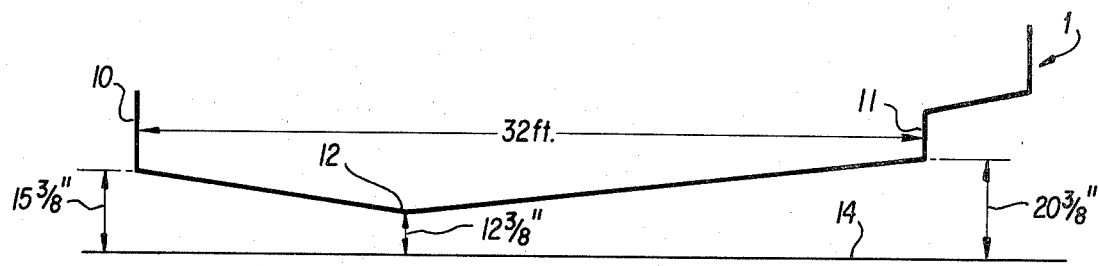
FIG. 6 is a cross-sectional view illustrating the relative proportions in shaping the floor plan.

The frac-tank is made of heavy gauge steel rectangular walls which are 40 feet in length and 8 feet in width. The floor of the tank is 32 feet in length. When empty, it is brought to a well site by means of a tractor 2 and is aligned by means of an erected fence 3. The tractor is then disconnected as shown in FIG. 2. This tank is then filled with a mixture of salt water, acid and pebbled mud. The exit pipe 4 is then connected to vacuum pump 5 as shown in FIG. 3. This exit pipe may be constructed either inside the wall as in FIG. 4 or outside the wall as in FIG. 5. The floor is so constructed as to enable all the fluid mixture to be emptied from the tank regardless of the pitch of the underlying ground. At a height of 8 inches from the bottom wall at the rear end 15 of the tank and extending the full width of the tank, the floor is pitched toward a point 16 that is about 6 feet from the front wall 17 along the length of the tank. On the front wall 17, at a point along the wall that is about ¼ foot from the bottom wall, the floor is pitched to meet the rear portion of the floor at the point 16 where the open end of the exit pipe 4 is contiguously located. In fact, FIG. 6 indicates the modified floor plan more clearly wherein measuring the heights of the floor from either side of the tank walls and the low point from the ground 14 to the floor measures about 15 inches on one side 10 and about 20 inches on the other side 11 with a low point 12 measuring about 12 inches. In FIG. 4 there is shown a construction wherein the exit pipe is within a wall of the tank. In FIG. 5, the construction shows the exit outside of a wall of the tank with one end located opposite point 12, as seen in FIG. 6. It is understood that in either construction the open end of the exit pipe is located contiguous to the low point of the tank floor. With this reverse construction of the tank floor, it is possible to remove all of the fluid regardless of the pitch of the underground.

To sum up, the elimination of ground build up required for conventional floored frac-tanks saves both time and labor which means less money cost. In addition, the use of this reverse sloped floor of this invention prevents build up of undue pressure of the fluid on the front wall when using conventionally floored frac-tanks. The reverse sloped floor of this invention prevents weakening of this front wall of the tank.

While I have shown and described a specific embodiment of my invention, it is understood that it is capable of some modification. Changes, therefore, in the construction and arrangement of the structure may be made without departing from the spirit and scope of the invention as disclosed in the specification and in the appended claims.

What is claimed is:

1. A mobile fluid storage tank having a floor structure that enables fluid to be completely emptied regardless of the pitch of its underlying ground wherein said floor comprises a reverse floor plan wherein two converging pitched portions meet at a common low point that is located approximately in a 3 to 1 ratio along its length for the full width of said tank.

2. The structure of claim 1 wherein the tank is rectangular and constructed of heavy gauge metal.

3. The structure of claim 1 wherein an exit pipe is aligned contiguous to the low point of the floor.

4. The structure of claim 1 wherein an exit pipe is constructed to be within the tank wall.

5. The structure of claim 1 wherein an exit pipe is constructed to be, at one end, outside of the tank wall.

6. The structure of claim 1 wherein the reversed pitched floor extends to the full length of the tank.

* * * * *